United States Patent [19]
O'Brien

[11] 3,992,640
[45] Nov. 16, 1976

[54] PIEZO CRYSTAL HOUSING AND MOUNT
[75] Inventor: Robert F. O'Brien, Rochester, N.Y.
[73] Assignee: Eastman Kodak Company, Rochester, N.Y.
[22] Filed: Nov. 29, 1974
[21] Appl. No.: 528,528

[52] U.S. Cl. ............................................... 310/8.7
[51] Int. Cl.² ........................................ H01L 41/04
[58] Field of Search ............... 310/8.3, 8.7, 9.1, 9.4; 317/DIG. 11

[56] References Cited
UNITED STATES PATENTS

| | | | |
|---|---|---|---|
| 3,360,665 | 12/1967 | Boswell | 310/8.7 |
| 3,457,461 | 7/1969 | Steinke et al. | 310/8.7 X |
| 3,462,234 | 8/1969 | Branson et al. | 310/8.7 UX |
| 3,475,654 | 10/1969 | Ochia; et al. | 310/8.7 X |
| 3,486,075 | 12/1969 | Steinke et al. | 310/8.7 X |
| 3,502,913 | 3/1970 | Osada | 310/8.7 |
| 3,509,388 | 4/1970 | Mifune et al. | 310/8.7 |
| 3,564,341 | 2/1971 | Nishiura | 310/8.7 X |
| 3,585,417 | 6/1971 | Helfen | 317/DIG. 11 |

Primary Examiner—Mark O. Budd
Attorney, Agent, or Firm—T. H. Close

[57] ABSTRACT

A housing for a piezoelectric crystal comprising an outer shell, preferably formed of nylon, in which are assembled two anvils and a piezoelectric crystal. The outer shell is heated and spun over to retain the anvils and crystals within the housing. Also disclosed is a mount for retaining the housing within a photographic camera and for providing electrical connections to the crystal.

2 Claims, 5 Drawing Figures

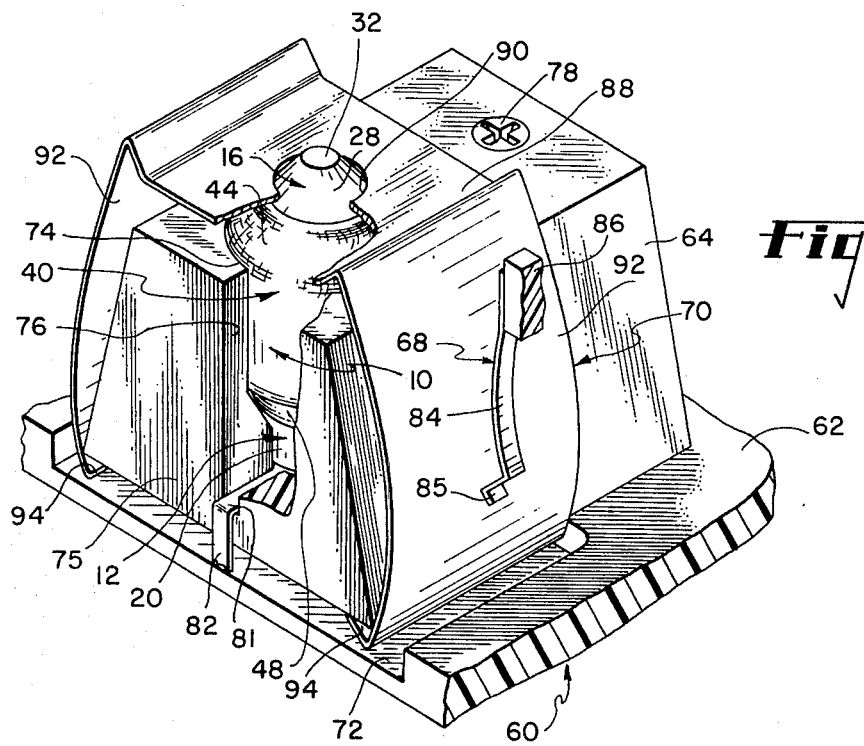
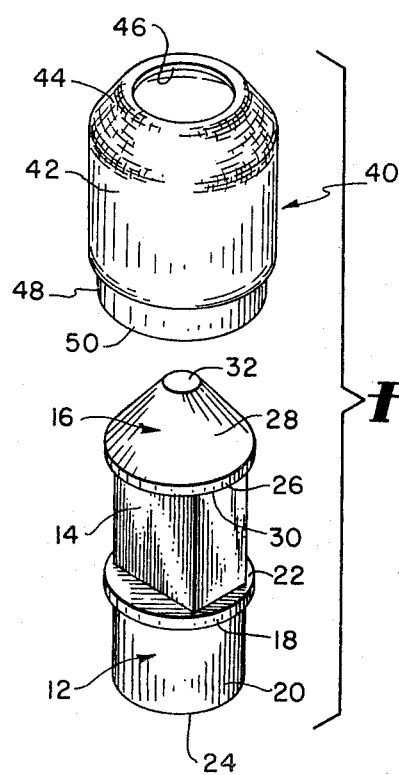
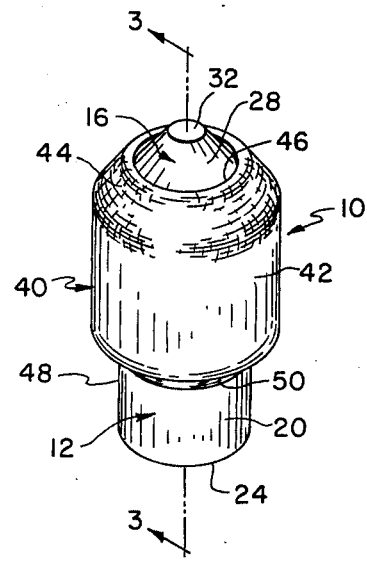

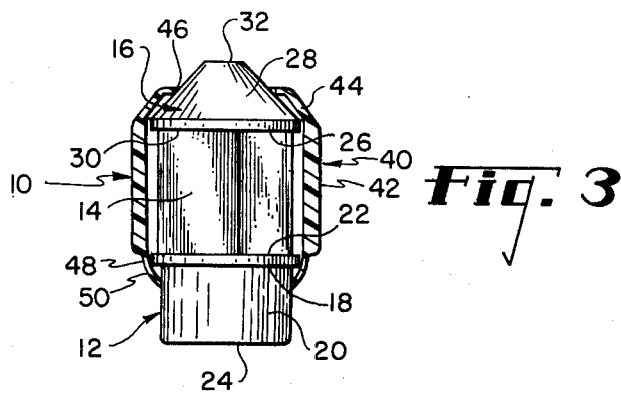
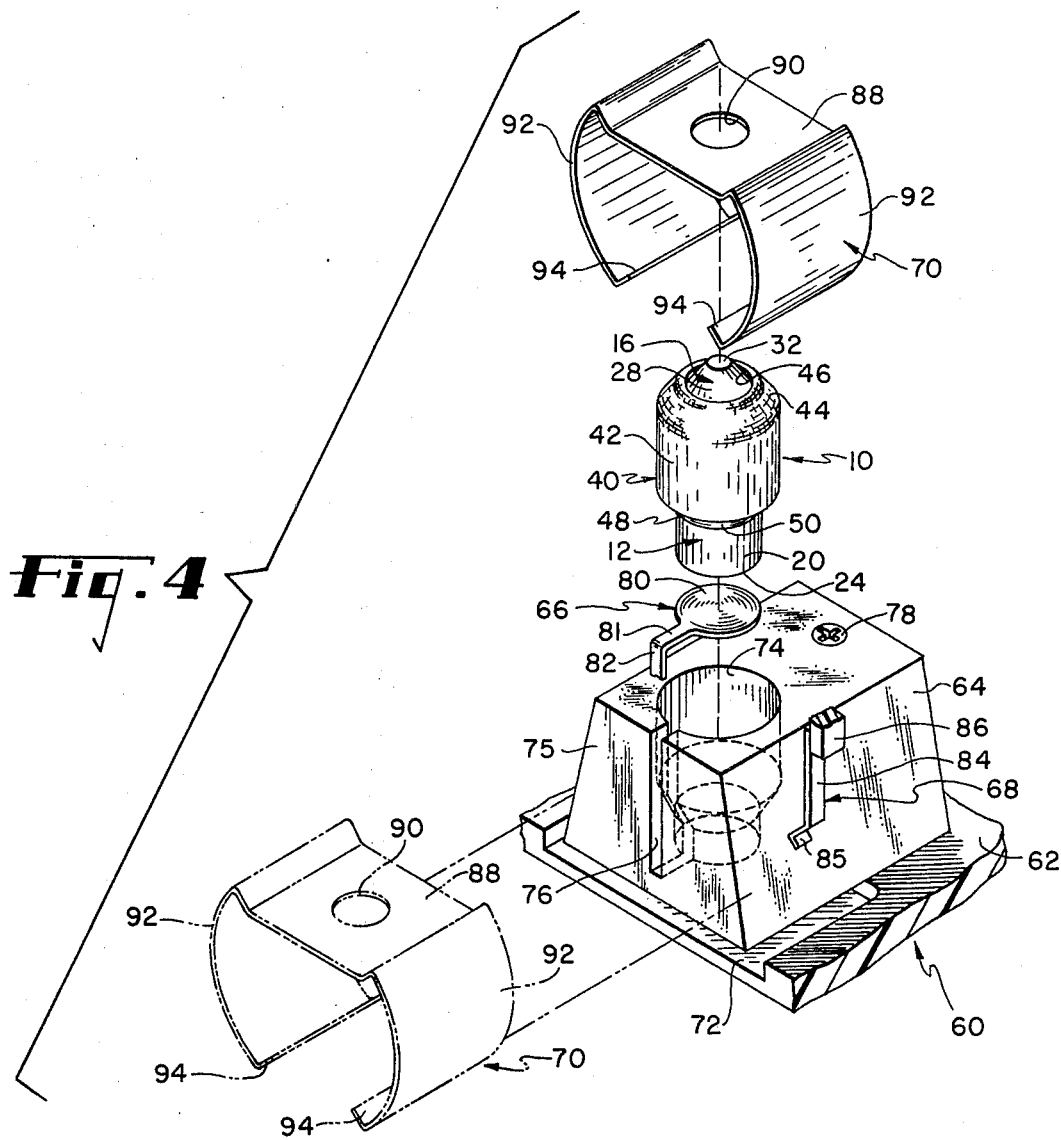

PIEZO CRYSTAL HOUSING AND MOUNT

CROSS REFERENCE TO RELATED APPLICATIONS

Reference is made to commonly assigned, copending U.S. Pat. application Ser. No. 528,529; entitled CAMERA FLASH SOCKET; and filed in the names of Jerry L. Hargrave and Harold L. Malone.

BACKGROUND OF THE INVENTION

1. Field of the Invention

The present invention relates to photographic apparatus and, in particular, to a piezoelectric device suitable for operating a flashlamp in conjunction with such apparatus.

2. Description of the Prior Art

It is known in the photographic arts to provide for the ignition of a flashlamp by means of an electric pulse generated by a piezoelectric crystal and to provide for the synchronization of such flash ignition with shutter operation of a camera. See U.S. Pat. Nos. 2,856,564; 2,972,937 and 3,106,080. More recently, apparatus has been developed in which a plurality of flashlamps, fireable by electric energy generated by a piezoelectric crystal, are assembled into a multilamp array. In one such array, as is disclosed more fully in the referenced, copending application Ser. No. 528,529, all of the lamps are aligned in the same direction and each lamp has its own reflector, with a switching mechanism, internal to the array, for firing a particular lamp. As the piezoelectric crystal is to be struck repeatedly, it becomes necessary and desirable to provide mechanisms for mounting the crystal within the camera so that a multitude of electric pulses of substantially the same magnitude and duration may be produced.

SUMMARY OF THE INVENTION

Accordingly, it is an object of the present invention to provide an improved housing for a piezoelectric crystal;

It is a further object of the present invention to provide such an improved housing which is inexpensive to manufacture;

It is a further object of the present invention to provide such an improved housing in which a piezoelectric crystal, anvils and associated electric connections may be easily assembled;

It is a further object of the present invention to provide a mount for a piezoelectric device for retaining the device securely in position within photographic apparatus;

It is a further object of the present invention to provide such a mount into which a piezoelectric device may be easily assembled.

These and other objects of the present invention are provided by a housing comprising an outer shell into which a pair of anvils and a piezoelectric crystal may be easily assembled, forming a piezoelectric crystal generator. During assembly, the outer shell is heated so as to permit forming of the shell around the crystal and anvils to retain them within the housing. Provision is made for providing electrical contacts to the anvils associated with the crystal.

Also disclosed is a mount for such a unitary piezoelectric generator within a camera, including a recess into which the generator may be easily inserted with a spring clip for securely retaining the generator within the recess. In a preferred embodiment, the spring clip is utilized to provide electrical connection to one of the anvils within the housing with connection to the second anvil being provided by an electrical lead assembled within the mount.

DESCRIPTION OF THE DRAWINGS

In the description of the preferred embodiment of the invention presented below, reference is made to the accompanying drawings in which:

FIG. 1 is an exploded view of a piezoelectric device according to the present invention prior to assembly;

FIG. 2 is a perspective view of the piezoelectric device according to FIG. 1 after assembly;

FIG. 3 is a section view of the piezoelectric device along the line 3—3 of FIG. 2;

FIG. 4 is an exploded view of a mount according to the present invention with the piezoelectric device of FIG. 1; and FIG. 5 is a perspective view of the mount of FIG. 4 and the piezoelectric device of FIG. 1 after assembly.

DESCRIPTION OF THE PREFERRED EMBODIMENT

Because photographic apparatus is well known, the present description will be directed in particular to elements forming part of, or cooperating more directly with, the present invention. Elements not specifically shown or described herein are understood to be selectable from those known in the art.

Referring now to FIGS. 1–3, a piezoelectric crystal generator 10 comprises an anvil 12, a piezoelectric crystal 14, and an anvil 16. Anvil 12 comprises a flange 18 and a cylinder 20. Flange 18 and cylinder 20 are preferably brass, with cylinder 20 being substantially longer and of slightly smaller diameter. Flange 18 and cylinder 20 terminate in surfaces 22 and 24, respectively, both of which are substantially flat and are plated with nickel. Piezoelectric crystal 14 is preferably generally cube-like in shape although other shapes are also possible. Anvil 16 comprises a cylinder 26 integrally formed with a frustro-conical portion 28. Cylinder 26 and frustro-conical portion 28 terminate in surfaces 30 and 32, respectively, both of which are substantially flat and are plated with nickel.

A housing 40 is provided which may be formed of a single piece of a suitable electrically-insulating material, such as nylon or a similar plastic. Prior to assembly, housing 40 consists of a central cylinder 42 with a hollow core; a frustro-conical end 44 in which a center opening 46 is formed; and an end cylinder 48, having a slightly smaller outer diameter than central cylinder 42, which terminates in an end 50 and also defines a center opening (not shown). During assembly, anvil 16 is inserted into housing 40 with frustro-conical portion 28 aiding in orienting anvil 16 within housing 40. Anvil 16 and housing 40 are dimensioned so that the end of frustro-conical portion 28 of anvil 16 extends through center opening 46. Piezoelectric crystal 14, which has been polarized by suitable methods so that an electric field will be produced when it is stressed, is inserted into the hollow core of housing 40, coming to rest upon surface 30 of anvil 16. Anvil 12 is then inserted into housing 40 with surface 22 coming to rest upon piezoelectric crystal 14. Piezoelectric crystal 14 is inserted so that the electric field will be produced between the surfaces in contact with surfaces 22 and 30. The entire package is then heated and housing 40 is spun so as to form end 50 of cylinder 48 over flange 18 of anvil 12, resulting in a piezoelectric generator 10 as shown in FIGS. 2 and 3.

Assembly of anvils 12 and 16 and piezoelectric crystal 14 into housing 40, along with the forming operation, may be easily achieved by automatic assembly techniques. During assembly of a preferred embodiment of generator 10, a dielectric material in a fluid form is placed on either or both of surfaces 22 and 30, in an amount sufficient to cover the entire surface of piezoelectric crystal 14. Such a coating has been found to reduce electric sparking within generator 10 and to reduce breakage of piezoelectric crystals. A silicone grease, an epoxy type fluid or similar materials are suitable for such use. After assembly, anvils 12 and 16 and piezoelectric crystal 14 are securely retained within housing 40. The polarization axis of piezoelectric crystal 14 extends between anvils 12 and 16 so that, when either anvil is struck, electrical energy will be generated by piezoelectric crystal 14.

Mount 60 includes a plate 62, a base 64, first and second electrical connectors 66 and 68 and a spring clip 70. Plate 62 is fixed within the camera and may be a wall of the camera housing or affixed to such a wall. Plate 62 includes a recess 72, which is generally rectangular. Plate 62 and base 64 are formed of a moldable material, such as polycarbonate or other suitable plastic material. Base 64 is generally trapezoidal in cross-section and includes a recess 74, which is generally cylindrical and is suitably dimensioned to receive and hold housing 40 with part of frustro-conical portion 28 projecting from recess 74. Base 64 further has a slot 76, extending into recess 74 through a side wall 75 of base 64 for the length of recess 74. Base 64 is fixedly mounted within the camera by a bolt or screw 78 or other retaining means and extends at least partially over recess 72 in plate 62.

First electrical connector 66 includes a cylindrical contact portion 80, an arm 81 and a connector 82. Cylindrical contact portion 80 is suitably dimensioned to fit within recess 74 with arm 81 extending through slot 76. Connector 82 may be affixed to an electrical lead or other suitable electrical connection means within the camera.

Second electrical connector 68 includes a leaf spring 84, which is elongated and terminates in an end 85, which is generally V-shaped. Leaf spring 84 is fixedly mounted on a wall or plate 86 that is fixed within the camera. Leaf spring 84 is electrically connected to an electric lead or other suitable electrical connection means within the camera.

Spring clip 70 includes a top wall 88, defining a central opening 90, and a pair of spring walls 92, which are arcuate, extending from top wall 88 and each terminating in a retaining clip 94. Central opening 90 is suitably dimensioned to mate with frustro-conical portion 28 of anvil 16 in housing 40.

For assembly, first electrical connector 66 is inserted within recess 74 with arm 81 passing through slot 76. Housing 40 may then be inserted within recess 74 with anvil 12 being inserted first and surface 24 coming into contact with cylindrical contact portion 80 of first electrical connector 66, providing electrical connection to anvil 12. Spring clip 70 is then positioned with frustro-conical portion 28 of anvil 16 extending through central opening 90 while contacting top wall 88 and with retaining clips 94 engaging the bottom of base 64 within recess 72. During such assembly, one spring wall 92 of clip 70 comes into engagement with end 85 of second electrical connector 68, thereby providing electrical connection to anvil 16. In a preferred embodiment, spring clip 70 is designed and constructed to subject piezoelectric crystal 14 to compressive force when housing 40 is mounted within the camera by means of spring clip 70. The compressive force is selected to approximately equal the force with which piezoelectric generator 10 is to be struck during operation. Such prestressing of piezoelectric crystal 14 insures that the crystal is always in compression, even during initial recovery from a striking force, and reduces the possibility of crystal breakage.

It may thus be seen that a housing has been provided for assembling a piezoelectric crystal along with its associated anvils and a mount has been provided for receipt of such a unitary piezoelectric crystal generator within a camera.

The invention has been described in detail with particular reference to a preferred embodiment thereof, but it will be understood that variations and modifications can be effected within the spirit and scope of the invention.

I claim:

1. A piezoelectric crystal device comprising:
a first anvil having a frustro-conical portion and a cylindrical portion;
a second anvil having a flange and a cylindrical portion, said flange having a larger outer diameter than said cylindrical portion;
a piezoelectric crystal;
a housing comprising a frustro-conical portion, a center portion and a closing portion, said frustro-conical portion defining a central opening and being configured to receive said frustro-conical portion of said first anvil with at least a portion of said first anvil extending through said central opening, said center portion being generally cylindrical and being configured to receive said cylindrical portion of said first anvil and to receive said piezoelectric crystal, and said closing portion being generally cylindrical, having a smaller wall thickness than said central portion and being configured to receive said flange and to engage said cylindrical portion of said second anvil to retain said first and second anvils and said piezoelectric crystal within said housing;
a first electrical connector comprising a cylindrical portion and an arm extending therefrom;
a second electrical connector comprising a leaf spring and means for mounting said leaf spring; and
a mount comprising a base and a spring clip, said base defining a cylindrical recess and a longitudinal slot extending along the periphery of said cylindrical recess, said cylindrical recess and longitudinal slot being configured to receive said housing and said first electrical connector with said arm extending through said longitudinal slot and with said cylindrical portion of said first connector in contact with said second anvil, and said spring clip being electrically conductive and comprising a flat wall and a pair of spring walls extending from said flat wall, each spring wall terminating in a retaining clip, said flat wall defining a central opening axially aligned with said cylindrical recess through which a portion of said first anvil extends while in contact with said flat wall, and said retaining clips releasably engaging said base with said housing and first electrical connector retained within said cylindrical recess and with said spring clip in contact with said leaf spring.

2. A piezoelectric crystal device comprising:
a first anvil having a frustro-conical portion and a cylindrical portion;
a second anvil having a cylindrical portion and a flange;
a piezoelectric crystal;
a housing comprising a frustro-conical portion configured to receive said frustro-conical portion of said first anvil and defining a central opening through which said frustro-conical portion of said first anvil extends, a generally cylindrical portion configured to receive said cylindrical portion of said first anvil and to receive said piezoelectric crystal, and a cylindrical closing portion configured to receive said flange and to engage said cylindrical portion of said second anvil and to retain said first and second anvils and said piezoelectric crystal within said housing; and
means, including a spring clip, for mounting said housing and for providing electrical connection to said first and second anvils, said spring clip being electrically conductive and having a portion defining an opening through which a portion of said frustro-conical portion of said first anvil extends whereby electrical contact is made with said first anvil and a portion of said first anvil is exposed for striking.

* * * * *